July 12, 1960
J. JARVIS
2,944,526
HYDRAULIC ACCELEROMETER
Filed Nov. 21, 1956
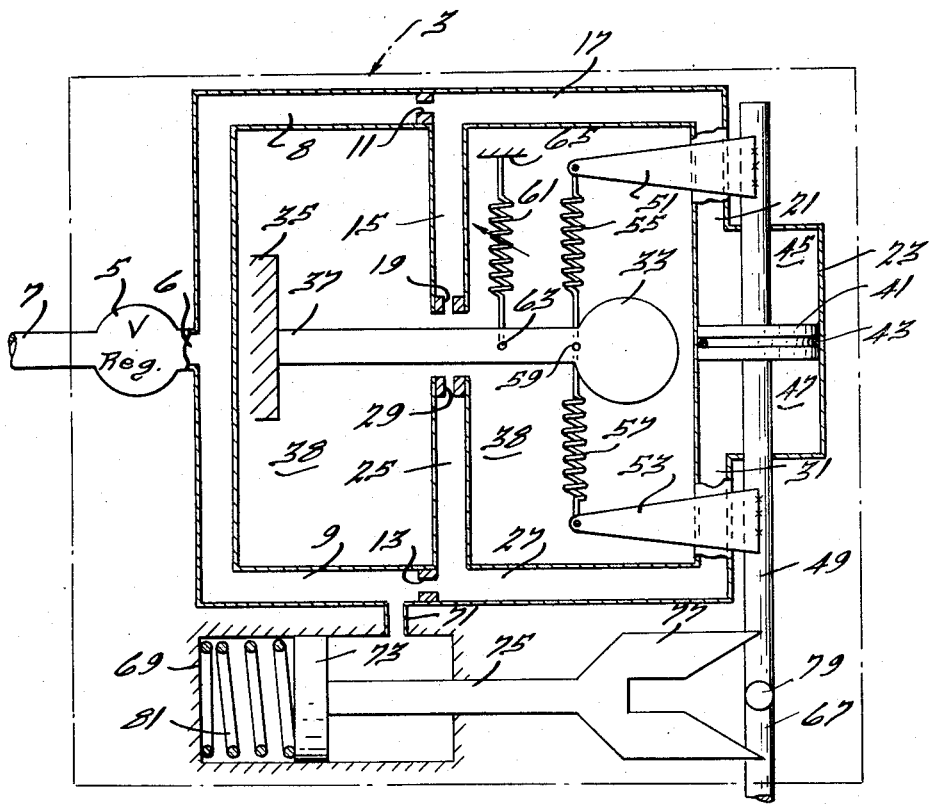
INVENTOR.
John Jarvis.
BY
Harness, Dickey & Pierce
ATTORNEYS.

2,944,526

HYDRAULIC ACCELEROMETER

John Jarvis, Mount Clemens, Mich., assignor to Cadillac Gage Company, Detroit, Mich., a partnership of Michigan Filed Nov. 21, 1956, Ser. No. 623,647

3 Claims. (Cl. 121—41)

This invention relates generally to a hydraulic system for indicating the acceleration of aircraft and more particularly to a hydraulic system for providing a mechanical output as a function of acceleration for actuating certain linkages in the flight control system of a helicopter.

It is known that, because of the extraordinary disturbance of air associated with the movement of the rotor blades of a helicopter, altitude cannot be measured satisfactorily with known instruments and since there exists no practical way of measuring either vertical velocity or displacement, acceleration must be relied upon to afford indication of the vertical position of a helicopter relative to the earth.

Accordingly, important objects of the invention are to provide improved hydraulic means for reliably and accurately measuring the acceleration of a helicopter and effecting a mechanical output which is proportional thereto; and to provide such means in the form of a self-contained closed loop servo system of relatively few parts which may be readily incorporated in conventional flight control hydraulic systems of aircraft.

The above and related objects will become apparent during the course of the following description taken in conjunction with the accompanying drawings in which the single figure is a diagrammatic view of the improved hydraulic system embodying the invention.

Briefly and in a broad aspect, the invention is embodied in a hydraulic system which comprises sensing means for sensing the acceleration of a moving object, particularly of aircraft, which includes guided missiles. The sensing means is of a type arranged to be actuated in proportion to acceleration. Means are provided to effect a pressure difference in the hydraulic system as a function of the movement of the sensing means and actuated means effects a mechanical movement proportional to the pressure difference established in the system. The system includes feed back means responsive to the actuated means and arranged to counteract the movement of the sensing means to establish a steady state displacement thereof. The resulting mechanical output can be utilized to control certain parts of the flight control system of the aircraft, as for example, on a helicopter, the pitch of the rotor blades.

Referring now to the drawing, therein is shown a diagrammatic view of a preferred embodiment of the invention which comprises a self-contained closed loop hydraulic system, indicated generally at 3 and which will be assumed to be employed on a helicopter for purposes of description. The entire system preferably is submerged in hydraulic fluid. Conveniently, the source of pressure fluid is obtained from the conventional flight control hydraulic system presently used on helicopters which is not shown and does not constitute a part of the present invention. The self-contained system 3 includes a conventional pressure regulator, shown diagrammatically and indicated at 5, which functions to maintain a constant operating pressure on the exit side thereof, as at 6, irrespective of variations in the supply pressure from the flight control hydraulic system, the inlet for which is indicated at 7. The constant pressure hydraulic fluid leaving the pressure regulator 5 is directed into two independent fluid paths 8, 9 in which are disposed fixed nozzles having orifices 11, 13 respectively. The pressure fluid leaving the fixed orifice 11 is divided by a pair of branch passageways 15, 17 which lead, respectively, to a nozzle having a controllable orifice 19 and one side, as at 21, of a cylinder 23. Similarly, the pressure fluid leaving the fixed orifice 13 is divided by a pair of branch passageways 25, 27 which lead, respectively, to a nozzle having a controllable orifice 29 and the other side, as at 31, of the cylinder 23. The flow of hydraulic fluid through the orifices 19, 29 is controlled by sensing means responsive to vertical acceleration of the helicopter and in the embodiment shown the sensing means is in the form of a weight 33 suspended in cantilever fashion from a stationary structure, as at 35, of the helicopter by a flexible rod 37. Movement of the weight 33 due to vertical acceleration of the helicopter will cause the rod 37 to flex toward one and away from the other of the orifices 19, 29 depending upon the direction of the acceleration of the aircraft. The pressure fluid issuing from the orifices 19, 29 impinges upon the rod 37 and discharges into the chamber, indicated generally at 38, which is in communication with the return side of the source by means not shown. Operating within the cylinder 23 is a piston 41 the periphery of which is provided with an O-ring 43 to divide the cylinder 23 into two fluid isolated chambers, generally designated 45, 47. Extending outwardly from opposite sides of the piston 41 through the cylinder 23 is a piston rod 49. Secured to the piston rod 49 beyond opposite ends of the cylinder 23 is a pair of links 51, 53. To the free end of the links 51, 53 is secured one end of feed back springs 55, 57, respectively, the other end of each of which is in turn secured to the flexible rod 37 and weight 33, as at 59. There is also provided a zero adjusting spring 61, one end of which is secured to the flexible rod 37, as at 63, the other end of which is secured to a stationary portion of the helicopter as at 65. The zero adjust spring 61 is adapted to compensate for inequalities which initially exist in the two halves of the system due to variations within tolerances of the size of the corresponding parts in each halve.

In operation, when the helicopter is accelerated or decelerated in a vertical direction, the weight 33 being merely suspended will be actuated relative to the helicopter depending upon the condition that exists. Assuming for purposes of explanation that the helicopter is accelerated in an upward direction as viewed in the single figure of the drawing, the weight 33 and rod 37 will be actuated in proportion to the acceleration in a downward direction relative to the stationary structure 35. As a result, the flow of hydraulic fluid through the orifice 29 will be restricted and the flow through the orifice 19 will be correspondingly enlarged. The pressure in the branch lines 25, 27 and in the chamber 47 will be increased and the pressure in the branch lines 15, 17 and in the chamber 45 correspondingly decreased. The pressure drops effected across the fixed orifices 11, 13 isolate the pressure in the branch lines 15, 17 and 25, 27 from the pressure in the main lines 8, 9 respectively. The pressure differential in the chambers 45, 47 is proportional to the acceleration of the helicopter since the increase in the pressure drop across the orifice 29 and the decrease in the pressure drop across the orifice 19 is proportional to the movement of the weight 33 and rod 37. As a result of the unbalance of the pressure in the chambers 45, 47 the piston 41 and the piston rod 49 are actuated in an upward direction as viewed in the single figure of the drawing. The movement of the piston rod 49 carries with it the pair of links 51, 53 and the movement of the link 51 in an upward direction increases the tension in the feed back spring 55 over that imparted thereto by the original movement of the weight 33 and rod 37. Similarly the upward movement of the link 53 reduces the tension imparted to the feed back spring 57 by the original movement of the weight 33 and rod 37. The net effect of the movement of the pair of links 51, 53 on the weight 33 and rod 37 through the feed back springs 55, 57 respectively, is that the weight 33 and rod 37 tend to return to their original displacement. This tendency is opposed, however, by the acceleration of the helicopter and a steady state condition is reached wherein the displacement of the weight 33 and rod 37 is considerably less than the displacement that would occur without the feed back springs 55, 57. The rate of feed back through the feed back springs determines the net displacement of the piston rod 49 and typical of operating conditions is a steady state displacement which is approximately 5% of the displacement of the weight 33 and rod 37 that would occur in the absence of the feed back springs 55, 57. The feed back springs 55, 57 serve the important function of greatly increasing the accuracy and sensitivity of the system by sensing the movement of the weight 33 and rod 37 as they respond to the acceleration of the aircraft and immediately compensating for such movement to prevent over-shooting of the desired target condition by halting the movement of the weight 33 and rod 37 with a force which is proportional to the rate of change of the acceleration.

One end of the piston rod 49, as at 67, in the embodiment being described is adapted and intended to be connected to mechanical linkages (not shown) which control the pitch of the rotor blades of the helicopter so that in one application of use, for example, of the system of the present invention, the altitude of the helicopter can be maintained constant. In such instance any change from a given altitude would be reflected as a change in the acceleration of the helicopter and the pitch of the rotor blades through the arrangement described would be compensated for as a function of the acceleration to prevent any change in altitude. Since the movement of the weight 33 and rod 37 is always a function of the acceleration of the helicopter, it will be apparent that if the acceleration is a constant, the steady state displacement of the piston rod 49 is likewise constant. If the acceleration is a variable, the displacement of the piston rod 49 is likewise a variable which is a function of the rate of change of the acceleration.

A safety feature is incorporated in the system by the provision of a separate cylinder 69 arranged to communicate with the constant pressure hydraulic fluid in the line 9, as by the connecting line 71. Disposed within the cylinder 69 is a piston 73 on one side of which is affixed a piston rod 75, the outer end of which is bifurcated, as at 77, and adapted to engage a pin 79 secured on the piston rod 49 at the end 67 thereof. Operating within the cylinder 69 at the other side of the piston 73 is a compression spring 81, the spring constant of which is selected with respect to the area of the piston 73 so that when the pressure in the line 9 falls below a predetermined minimum, the spring 87 actuates the piston 73 and the piston rod 75 so that the end 77 thereof engages the pin 79 to lock the piston rod 49 in an inoperative position.

It will thus be seen that there has been provided by this invention a hydraulic control system in which the objects hereinabove set forth, together with many thoroughly practical advantages are successfully achieved. It will be apparent that the invention is susceptible to modification, variation and change without departing from the spirit thereof or from the scope of the appended claims.

What is claimed is:

1. A closed loop hydraulic system for providing a mechanical output proportional to the acceleration of an aircraft comprising a body defining a cylinder, means defining a pair of independent fluid paths each including a nozzle having an orifice, said orifices being disposed in closely spaced opposed confronting relationship, means communicating each of the opposite ends of said cylinder with one of said paths on the entrance side of the orifice therein, means to direct flow of hydraulic fluid from a pressure source through said paths including said orifices in a steady state condition of flow, a piston movable in said cylinder having a piston rod extending beyond opposite ends of said cylinder, a flexible rod having one end secured to a stationary structure of said aircraft, said rod extending between said orifices and being movable between said orifices on the exit side of each thereof, a weight suspended on the other end of said flexible rod, said flexible rod being arranged to vary the flow oppositely through said orifices from said steady state condition upon acceleration of said aircraft to unbalance the fluid pressures on the entrance side of each of said orifices and on opposite sides of said cylinder, and a pair of feedback springs each having one end movable with said flexible rod and the other end movable with said piston rod on one of the opposite sides of said piston, said feedback springs tending to restore said steady state condition whereby the displacement of said piston is proportional to said acceleration.

2. A closed loop hydraulic system for providing a mechanical output proportional to the acceleration of an aircraft comprising a body defining a cylinder, means defining a pair of independent fluid paths each including in the direction of flow therethrough a first nozzle having a first orifice and a second nozzle having a second orifice, said second orifices being disposed one above the other in closely spaced opposed confronting relationship, means communicating each of the opposite sides of said cylinder with one of said paths on the exit side of the first orifice and on the entrance side of the second orifice therein, means including pressure regulating means to direct flow of hydraulic fluid from a pressure source through said paths including said first and second orifices in a steady state condition of flow, a piston movable in said cylinder having a rod extending beyond opposite ends thereof, a flexible rod having one end secured to a stationary structure of said aircraft, said rod extending between said second orifices and being movable in opposite vertical directions between said second orifices on the exit side of each thereof, a weight suspended on the other end of said flexible rod, said flexible rod being effective to vary the flow of fluid oppositely through said second orifices from said steady state condition upon acceleration of said aircraft to unbalance the fluid pressures on the one side of each of said second orifices and on opposite sides of said cylinder, a pair of feedback springs each having one end movable with said flexible rod and the other end movable with said piston rod on one of the opposite sides of said piston tending to restore said steady state condition whereby the displacement of said piston is proportional to said acceleration, and a zero-adjust spring having one end secured to said flexible rod and the other end secured to a stationary structure of said aircraft.

3. A closed loop hydraulic system for providing a mechanical output proportional to the acceleration of an aircraft comprising a body defining a cylinder, means defining a pair of independent fluid paths each including in the direction of flow therethrough a first nozzle having a first orifice and a second nozzle having a second orifice, said second orifices being disposed one above the other in closely spaced opposed confronting relationship, means communicating each of the opposite sides of said cylinder with one of said paths on the exit side of the first orifice and on the entrance side of the second orifice therein, means including pressure regulating means to direct flow of hydraulic fluid from a pressure source through said paths including said first and second orifices in a steady state condition of flow, a piston movable in said cylinder having a rod extending beyond opposite ends thereof, a flexible rod having one end secured to a stationary structure of said aircraft, said rod extending between said second orifices and being movable in opposite vertical directions between said second orifices on the exit side of each thereof, a weight suspended on the other end of said flexible rod, said flexible rod being effective to vary the flow of fluid oppositely through said orifices from said steady state condition upon acceleration of said aircraft to unbalance the fluid pressures on the one side of each of said second orifices and on opposite sides of said cylinder, a pair of feedback springs each having one end movable with said flexible rod and the other end movable with said piston rod on one of the opposite sides of said piston tending to restore said steady state condition whereby the displacement of said piston is proportional to said acceleration, a zero-adjust spring having one end secured to said flexible rod and the other end secured to a stationary structure of said aircraft, and safety lock means comprising means defining a second cylinder having end walls, a second piston movable in said second cylinder and having a piston rod one end of which is secured to one side of said second piston and having detent means on the other end thereof, means communicating said second cylinder on said one side of said second piston with one of said fluid paths on the entrance side of one of said first orifices, spring means operating between one end wall of said second cylinder and the other side of said second piston and being operative to actuate said second piston upon a decrease in pressure on said one side of said second piston below a pre-selected pressure to engage said first-mentioned piston rod and retain the same in an inoperative position.

References Cited in the file of this patent

UNITED STATES PATENTS

| | | |
|---|---|---|
| 2,473,903 | Purifoy | June 21, 1949 |
| 2,500,407 | Segerstad | Mar. 14, 1950 |
| 2,520,944 | Lynn et al. | Sept. 5, 1950 |
| 2,698,157 | Ludeman | Dec. 28, 1954 |
| 2,767,689 | Moog | Oct. 23, 1956 |
| 2,790,427 | Carson | Apr. 30, 1957 |

FOREIGN PATENTS

| | | |
|---|---|---|
| 680,141 | Germany | July 27, 1939 |
| 561,759 | Great Britain | June 2, 1944 |
| 893,211 | France | June 2, 1944 |